United States Patent [19]
Jesernig et al.

[11] 3,808,776
[45] May 7, 1974

[54] DUST COLLECTOR

[75] Inventors: William J. Jesernig, Timonium, Md.; Arunas A. Arstikaitis, Dearborn Heights, Mich.

[73] Assignee: American Standard Inc., New York, N.Y.

[22] Filed: Dec. 9, 1971

[21] Appl. No.: 206,377

[52] U.S. Cl.................. 55/300, 55/304, 55/341, 55/378, 55/419
[51] Int. Cl............................................. B01d 46/04
[58] Field of Search......... 55/96, 97, 286, 287, 288, 55/295–305, 341, 378, 419

[56] References Cited
UNITED STATES PATENTS
3,545,178   12/1970   Sheehan.............................. 55/304

Primary Examiner—Bernard Nozick
Attorney, Agent, or Firm—Robert G. Crooks; Jefferson Ehrlich; John E. McRae

[57] ABSTRACT

A dust collector comprising vertical fabric filter tubes having upper and lower mouth openings connected to separate dusty gas manifolds so that dusty gas simultaneously flows downwardly through each upper mouth opening and upwardly through each lower mouth opening. Improved shaker mechanism is arranged intermediate the tube mouth openings.

3 Claims, 5 Drawing Figures

INVENTORS
WILLIAM J. JESERNIG
ARUNAS A. ARSTIKAITIS

DUST COLLECTOR

THE DRAWINGS

FIG. 1

Figure 1:
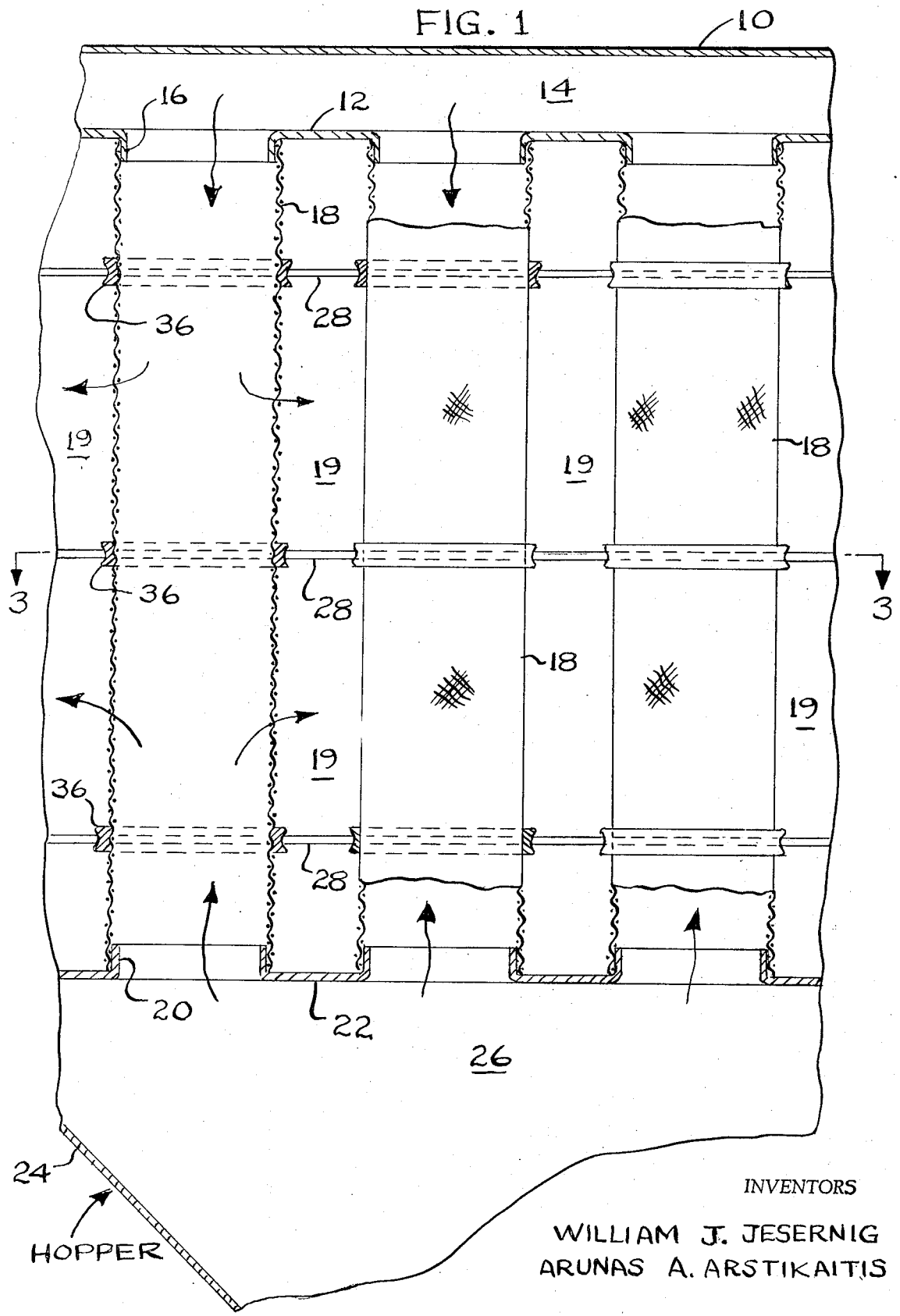
FIG. 1 is a fragmentary sectional view taken through a dust collector embodying the invention.

FIG. 1 fragmentarily shows a dust collector comprising a top wall 10 disposed above an internal orifice plate 12 to define an upper inlet manifold 14 for receiving dusty gas from an industrial source such as a cement plant, flour mill, foundry, carbon black plant, etc. Orifice plate 12 is formed with downwardly extending collars 16 which telescopically receive the upper open mouth portions of flexible tubes 18. Illustratively, each tube can have a diameter of 5 to 24 inches an a vertical axial length from 5 to 60 feet. The lower open mouth portions of tubes 18 telescope onto collars 20 formed or otherwise carried on stationary lower plates 22. The space below plate 22 is occupied by a dust collection hopper 24. Suitable clamps, not shown, are provided to retain each tube 18 on the respective collars 16 and 20.

The illustrated collector is a dual entry collector wherein dusty gas is simultaneously admitted to both ends of each tube 18. Thus, a portion of the dusty gas supply is initially admitted to upper manifold 14, and at the same time the remaining portion of the dusty gas is initially admitted to the lower manifold space 26 below plate 22 from a dust source S. The gas flows axially through each tube and out through the sides of the tube into clean air space 19, as shown by the directional arrows; the dust deposits on the inner surfaces of each tube.

During normal operations some of the dust may gravitationally drop off the tube surfaces and deposit in hopper 24. However eventually a film or cake of dust accumulates on the inner surfaces of each tube and impedes continued gas flow; accordingly it is necessary to periodically remove the accumulated dust.

Figure 2:
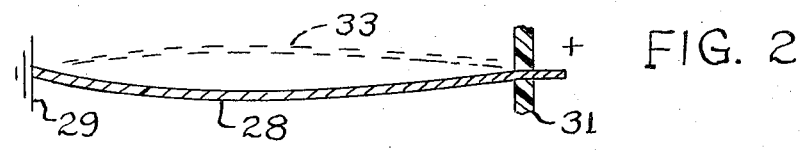
FIG. 2 illustrates pictorially a vibratory wire mechanism useful in practice of the invention.

In certain forms of the present invention a vibratable wire is used as the dust-removal mechanism. The wire may be arranged in a semi-taut condition between two anchorage points as shown pictorially in FIG. 2. As there shown, the wire 28 is hung between two anchorage points, 29 and 31, and an electrical potential is applied across the wire to produce a current flow from the positive end to the grounded end. It has been discovered that with suitable voltage potentials and amperages, for example 100 volts and 500 amps, the wire has a vibrational movement, between the full line position and dotted line position 33. The amplitude of this movement is probably fairly small, on the order of less than an inch with unsupported lengths of a few feet, but it is believed that such movement would be sufficient to effect a cleaning action on a fabric element if the wire were properly oriented with respect to the fabric surface.

Figure 3:
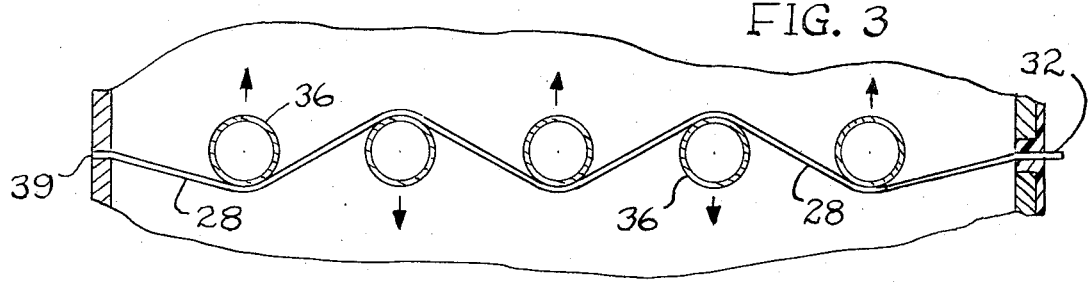
FIG. 3 is a reduced scale sectional view taken on line 3—3 in FIG. 1.

The present invention as embodied in FIG. 1, comprises a series of electrical wires or strands 28 extending normal to the fabric tube i.e., horizontally as viewed in FIG. 1. As shown in FIG. 3, each wire strand 28 extends from a fixed terminal 32 on board 30 leftwardly around the successive tubes 18 and back over to a stationary anchorage 39 which serves as an electrical ground.

When terminal 32 is connected to a power supply line having a sufficient electrical potential, the resulting current flow through wire 28 produces a slight vibrational deflection of the wire sufficient for the wire to produce lateral deflections of the contacted tubes. Preferably the portions of the tubes contacted by the wire are rigid in a circumferential sense so that the tubes are bodily deflected rather than merely depressed at the points of engagement with the wire. As shown in FIG. 1, each tube carries three rigid rings 36 for engagement with respective ones of the wires 28. The vibrational action of wires 28 on the rings 36 causes the rings to be shaken laterally in horizontal planes so that the connected tube material is shifted to move the accumulated dust from the interior surfaces of the tube into hopper 24. It will be understood that an electrical potential is applied to each bag only when it becomes necessary to clean the bags. During the so-called normal operating periods the wires 28 are deenergized, i.e., electrically deactive.

During the tube cleaning operation the flow of dusty gas to one or both of the manifolds 14 and 26 may be stopped to promote gravitational movement of the separated dust into hopper 24. Additionally, suitable valving may be actuated to cause a vacuum force to be applied to manifold 26, thus further helping to remove dust from each tube interior space.

A normal installation would comprise a number of modules or units, each comprising an upper manifold 14, a lower manifold 26 and a series of fabric tubes 18. The entire dusty gas load would be apportioned as evenly as possible between the various modules, as by dampers, vanes, or distributors. Usual practice would involve sequential cleaning of the tubes in the different modules, such that the tubes in only one module were being cleaned at any one moment. Thus, assuming a 10-module assembly, at any one moment nine modules would be operating, while the 10th was being cleaned.

FIG. 4

Figure 4:
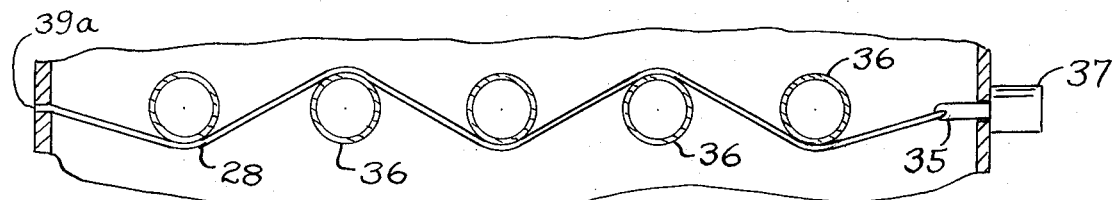
FIG. 4 is a view similar to FIG. 3 but illustrating another modification of the invention.

FIG. 4 illustrates a variation of the invention wherein the movement of the shaker wire strand 28 is obtained by solenoid or electro-magnetic action. As shown in FIG. 4, one end of wire 28 is attached to a stationary anchorage 39a. Each wire is trained around a number of tubes 18 in sinuous fashion so that its right end is connected at 35 to the armature-plunger of a conventional solenoid 37. Energization of the solenoid produces a slight rightward movement of the armature, which exerts a straighten-out force on wire 28. The stressed wire thereby deflects the partially-encircled tubes laterally in the directions denoted by the arrows in FIG. 3, thereby causing dust to be shaken from the interior surfaces of the tubes in the same manner as previously described in connection with FIG. 1. Solenoid 37 could of course be replaced by a conventional air cylinder, pneumatic motor, or motor-driven cam or lever arm.

FIG. 5

Figure 5:
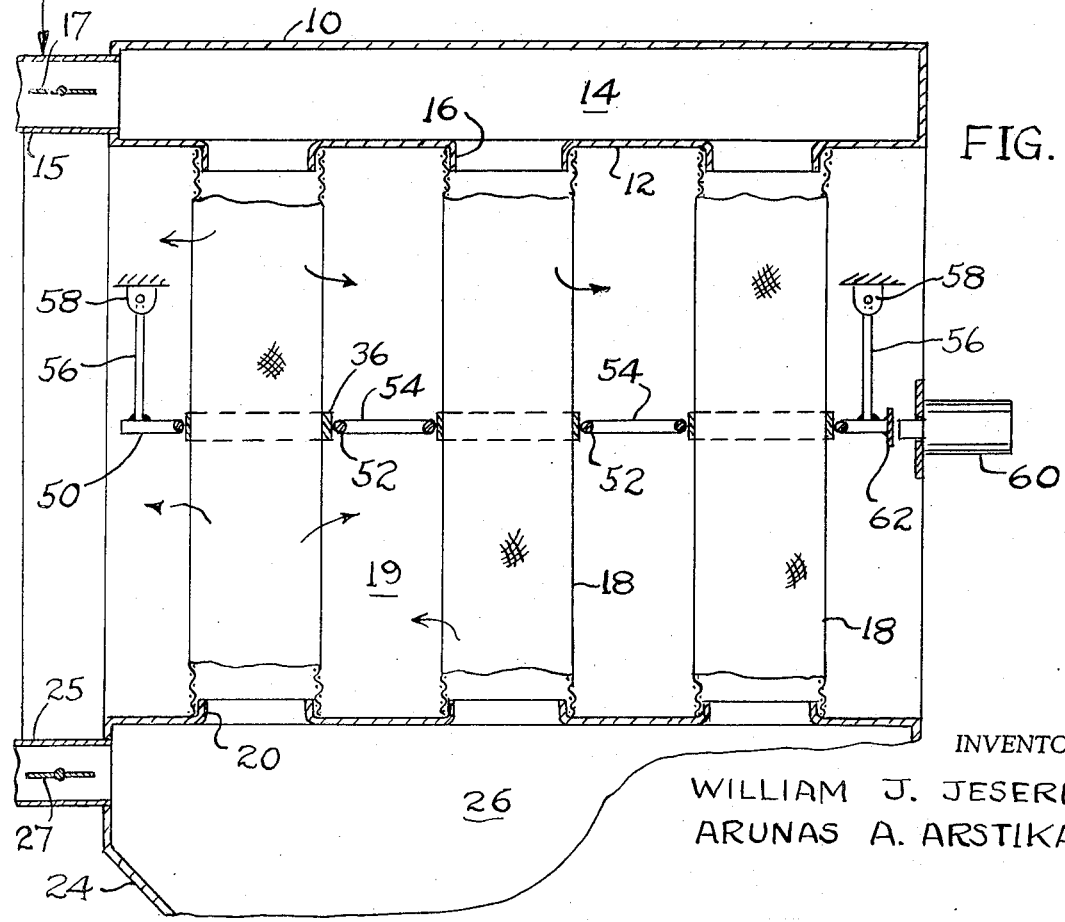
FIG. 5 is a reduced scale view of another bag collector embodying the invention.

FIG. 5 shows an arrangement wherein a portion of the dusty gas stream is admitted to the upper manifold 14 through a supply duct 15 equipped with a butterfly damper 17. The remaining portion of the dusty gas stream is admitted to the lower manifold 26 through a duct 25 equipped with a butterfly damper 27. During normal run periods both dampers 17 and 27 are open so that gas flows into the fabric tube through each manifold.

In the FIG. 5 arrangement, the tube-cleaning shaker force is provided by a horizontal frame 50 having circular ring elements 52 interconnected by straight connector rods 54. At its corners the frame is equipped with upstanding arms 56 which are pivotally connected to overhead stationary brackets 58. A solenoid fluid cylinder, or similar power device 60 is stationed in horizontal alignment with frame 50 to impart horizontal blows against the striker pad or bar 62 carried by frame 50. In this manner each of the fabric tubes is deflected laterally and thus freed of accumulated dust, as outlined in connection with FIGS. 3 and 4.

One or both dampers 17 and 27 may be closed while the shaker force is being applied to the fabric tubes. With certain types of dust the fabric cleaning operation may be enhanced by rapidly opening and closing one or both of the dampers 17 and 27 to produce gas pulsations in the fabric tubes. Such pulsations may in some cases assist the mechanical shaking force to remove dust accumulations from the tubes.

THE INVENTION

This invention provides dual mouth entry to each fabric tube, which is in contrast to conventional arrangements wherein the dusty gas is admitted to each tube through only one end, either the upper end or the lower end. One advantage of dual entry is less erosion at the tube mouths due to lower linear gas velocity. With an illustrative prior art single entry tube the tube might have a length of 30 feet and a diameter of 1 foot, giving a fabric surface area of about 94 square feet. Assuming a maximum permissible linear flow rate through the fabric of two linear feet per minute, the total volumetric flow through each tube would be about 188 cubic feet per minute. The linear flow rate at the single mouth opening of the tube would be about 237 feet per minute. Under certain dust loadings such a linear flow rate could cause erosion at the tube mouth. With the dual entry tube of the present invention, the linear flow rate at each mouth opening is one half the rate for the single entry tube (assuming the same tube diameter, tube length and volumetric flow). The dual entry tube is therefore less susceptible to mouth erosion.

Another advantage of the dual entry tube is lessened turbulence, particularly at each mouth opening where the gas is accelerating and changing direction. The lessened mouth linear velocities with dual entry tubes mean lessened pressure drop and therefore lesser fan operating costs (especially with large systems involving hundreds of bags).

It is also believed that dual entry bags may more fully use the entire fabric surface area than single entry bags. In single entry bags the gas tends to flow more readily through the fabric areas immediately adjacent the tube mouth than through the tube fabric areas remote from the mouth; consequently the dust cake builds up on the fabric more thickly near the bag mouth area than elsewhere so that relatively frequent cleaning (or continuous cleaning) is required in order to avoid excessive pressure drops. With dual entry tubes there are two "thicker" dust build-up zones so that each such zone builds up a dust layer at only about one-half the rate with single entry tubes.

The dual entry tube also avoids a gas rebound problem that sometimes occurs in single entry tubes. The closed end of a single entry tube tends to produce a semi-stagnant gas column which does not exhaust out of the tube at the same linear rate as the gas more remote from the closed tube end; there is a certain rebounding of the gas from the closed end surface that tends to impede gas outflow. With dual entry tubes the rebound problem is avoided because there is no closed end.

Of some importance is the fact that dual entry tubes can be longer than single entry tubes (for a given volumetric flow and tube diameter) because each of the two gas streams has to flow only one-half the total tube length. Dual entry makes possible longer tubes and accordingly lesser numbers of tubes, which means lessened floor space requirements. Single entry tubes commonly have length-diameter ratios from about 10-to-1 up to about 30 to-1. With dual entry tubes it should be possible to have length diameter ratios of at least 40-to-1, and conceivably 60-to-1.

Longer tube lengths may have some added benefit in promoting a greater shaking amplitude and/or lessened stress on the bag fibers. Thus, when the anchored ends of the bag (at collars 16 and 20) are relatively far apart the bag can swing laterally a further distance before stressing the fabric. The greater amplitude of motion should probably give a more thorough cleaning action.

As shown in the drawings, each force-applying (shaker) means acts on multiple numbers of tubes. Thus the force-applying means of FIGS. 3 and 4 acts on an entire row of tubes; the force-applying means of FIG. 5 acts on all the tubes in a given compartment or module. The illustrated multiple-tube shaker devices should be somewhat simpler and less costly than prior art devices. Also, they may possibly contribute to longer fabric life because in each case the shaker device provides a horizontal deflecting force on the contacted tube; there are no direct vertical force components that can produce appreciable axial stress on the fabric. The lateral swinging of the tubes does translate into a slight vertical force component, but if the tubes are long enough the stress on the fabric is essentially confined to horizontal planes; rings 36 provide tube rigidity in such planes.

FIG. 1 shows three force-applying strands 28 acting in various horizontal planes intermediate the tube upper and lower mouth openings. It is contemplated that in some cases only one or two sets of strands may be required. FIG. 5 shows a single force-applying means operating in a horizontal plane midway between the tube mouth openings. Additional force-applying means could be provided (as in FIG. 1). The stroke of each force-applying means need not be the same, and all of the force-applying means need not be actuated at the same time. Thus the lowermost strand 28 could be actuated more frequently than the middle strand in accordance with different anticipated dust build-ups in different fabric zones.

Advantageously the shaker mechanisms are located intermediate the upper and lower ends of the fabric tubes in the clean air space bewteen the manifolds. The shaker mechanisms are thus not subject to attack by the dust, and are easily accessible for servicing or during tube-replacement periods. It is not necessary to crawl inside the manifolds to replace the fabric tubes.

We claim:

1. A dust collector comprising separate upper and lower gas manifolds separately connected to a common source of dusty gas; a plurality of vertically arranged filter tubes each having upper and lower mouth openings connected to said separate respective upper and lower dusty gas manifolds so that dusty gases are caused to simultaneously flow downwardly into each tube through the upper mouth opening and upwardly into each tube through the lower mouth opening, said gases thereafter flowing through the tube walls as the dust is dislodged therefrom, leaving the dust on the tube wall inner surfaces; and a dust storage hopper located below and contiguous to said lower manifold for periodically receiving dust dislodged from the tube wall surfaces; each tube having a uniform cross section for its entire length, and each tube having a non-twisted orientation so that each tube forms a single continuous tube space of constant cross-section for the entire length between the two mouth openings, the tubes being semi-tautly bound to each other by wires engaging the outer wall surfaces of said tubes.

2. The collector of claim 1 and further comprising means for periodically shaking the tubes to cause collected dust to be dislodged from said tubes and released into the hopper; said shaking means comprising at least one rigid ring carried by each tube, and force-applying means acting horizontally against each ring to effect a shaker action on the respective tube; each force-applying means comprising the wires semi-tautly bound to the tubes for providing mechanically flexible electrically conductive elements connectable to a voltage source to produce an operating force by electrical impulse action.

3. A dust collector comprising separate upper and lower gas manifolds separately connected to a common source of dusty gas; a plurality of vertically arranged filter tubes having stationary upper and lower mouth openings connected respectively to said separate upper and lower dusty gas manifolds so that dusty gases are caused to simultaneously flow downwardly into each tube through the upper mouth opening and upwardly into each tube through the lower mouth opening, said gases thereafter flowing through the tube walls as the dust is dislodged therefrom leaving the dust on the tube wall inner surfaces; each tube having a uniform cross section for its entire length, and each tube having a non-twisted orientation so that each tube forms a single continuous tube space of constant cross section for the entire length between the two mouth openings; a dust storage hopper located below and contiguous to said lower manifold for periodically receiving dust dislodged from the tube wall surfaces; and means for periodically shaking the tubes to cause collected dust to be dislodged into the hopper; said shaking means comprising a first force-applying means acting horizontally on each tube near the upper mouth opening, and a second force-applying means acting horizontally on each tube near the lower mouth opening.

* * * * *